United States Patent [19]

Shima et al.

[11] 4,361,866

[45] Nov. 30, 1982

[54] POWER CONVERTER APPARATUS

[75] Inventors: Seiya Shima; Hiroaki Kuroha, both of Katsuta; Takeki Ando, Nakamachi; Toshiaki Kurosawa; Hiromi Inaba, both of Katsuta; Yoshio Sakai, Nakamachi, all of Japan

[73] Assignee: Hitachi, Ltd., Tokyo, Japan

[21] Appl. No.: 261,668

[22] Filed: May 7, 1981

[30] Foreign Application Priority Data

May 16, 1980 [JP] Japan ............................ 55-65604

[51] Int. Cl.³ .......................................... H02M 7/155
[52] U.S. Cl. .................................... 363/129; 318/811; 363/44
[58] Field of Search ............... 318/762, 811; 363/40, 363/41, 129, 44, 45

[56] References Cited

U.S. PATENT DOCUMENTS 3,371,261 2/1968 Hull et al. .......................... 363/129
4,164,015 8/1979 Espelage et al. ................ 363/129 X
4,245,293 1/1981 Terunuma et al. .

OTHER PUBLICATIONS

IEEE Transactions on Industry Applications, vol. IA-15, No. 6, Nov./Dec. 1979, "A Pulsewidth Controlled AC to DC Converter to Improve Power Factor and Waveform of AC Line Current".

Primary Examiner—William M. Shoop
Attorney, Agent, or Firm—Craig and Antonelli

[57] ABSTRACT

A power converter for power conversion between an a.c. system and a d.c. system includes a full-wave bridge circuit having GTO connected in at least one arm of the full-wave bridge circuit on the positive polarity side. During a conduction-enabled period of GTO which is determined by a firing phase angle, the GTO is so controlled as to perform current chopping operation by a pulse signal of a predetermined pulse width.

15 Claims, 21 Drawing Figures

POWER CONVERTER APPARATUS

The present invention relates to a power converter apparatus for power conversion between an alternating current or a.c. system and a direct current or d.c. system by means of a full-wave bridge circuit.

Heretofore, various power converter apparatus have been employed in practical applications for effecting power conversion between a single-phase or three-phase a.c. line and a d.c. system by using a single-phase full-wave bridge circuit or three-phase full-wave bridge circuit. The d.c. output voltage of the full-wave bridge circuit is controlled by varying correspondingly and controllably the firing phase angle of thyristors inserted in individual arms of the full-wave bridge circuit.

As a gate control for the thyristors, it is widely known that the thyristor or thyristors connected in an arm or arms of the full-wave bridge circuit on the positive polarity side as well as the thyristor or thyristors connected in an arm or arms of the bridge circuit on the negative polarity side are fired at an equal phase angle, wherein the phase angle is varied under control to thereby assure the control of the d.c. output voltage over a whole range from zero to the maximum value.

The hitherto known control system however suffers shortcoming that phase lag of the a.c. current relative to the a.c. voltage is increased as the d.c. output voltage is lowered. Consequently, reactive power is increased, involving a degraded power factor as well as increased ripple components, to adverse effect to the power source.

A power converter system which is intended for overcoming the abovementioned disadvantages has been already proposed by the same applicant as the present application. Reference is to be made to U.S. Pat. No. 4,245,293. According to this prior art control system, the firing phase angle is differentiated for the thyristors on the positive side and those on the negative side from each other in the low output voltage range so that a short-circuit mode takes place through both the groups of thyristors. With such arrangement, a significant improvement of the power factor is certainly attained. However, the power factor remains to be further improved in consideration of the fact that current ripples of low frequencies on the order of 150 Hz are produced in the output current.

Further, another system for improving the power factor has recently been reported in "IEEE TRANSACTIONS ON INDUSTRY APPLICATIONS, VOL IA-15, No. 6, NOVEMBER/DECEMBER 1979" under the title "A Pulsewidth Controlled AC to DC Converter To Improve Power Factor and Waveform of AC Line Current". According to this proposal, those elements which are capable of performing current breaking function are connected in respective arms of the full-wave bridge circuit on the positive side and adapted to carry out chopping operation. The output voltage of the bridge circuit can then be controlled by varying correspondingly the pulse width of the chopping control pulse signal. Since the a.c. voltage and current are caused to be in phase according to this control system, the power factor can be approximated to 1 (one unit). Moreover, the sixth harmonic component of the power source is scarcely contained in the d.c. output voltage, and the ripple component of the output current can be suppressed to a large degree.

However, it should be pointed out that the control system according to the aforementioned proposal encounters difficulty or limitation in controlling continuously the output voltage to a low value by correspondingly narrowing the pulse width of the chopping pulse signal. In reality, it is impossible to control the output voltage to a value lower than about 1/10 of the rated voltage with the aid of transistors or gate turn-off thyristor now commercially available. In this connection, it should be mentioned that there are numerous applications where the continuous control to 1/10 of the rated voltage is required. For example, in the case of a high speed elevator or lift system driven by a d.c. motor, it is often required that the speed be controlled continuously to about 1/1000 of the rated speed. In such case, the system according to the above mentioned proposal can not be adopted and thus has to be replaced by the control system such as the one disclosed in U.S. Pat. No. 4,245,293 cited above.

A primary object of the present invention is to provide a power converter apparatus for power conversion between an a.c. system and a d.c. system which can assure control of the output voltage over an extensive range with an improved power factor.

Another object of the invention is to provide a power converter apparatus which can assure control performance in a stable manner over a whole control range.

According to a general aspect of the invention, there is proposed a power converter apparatus for effecting power conversion between an a.c. system and a d.c. system by using a full-wave bridge circuit in which at least one arm is provided with controllable switch means capable of performing a current breaking function, which comprises phase angle control means for controlling the phase angle of the switch means, and means for controlling the pulse width of a chopping pulse signal which causes the switch means to perform current chopping operation, wherein the switch means are turned on and off by the chopping pulse signal of the controlled pulse width during a conduction-enabled period determined by the phase angle mentioned above.

According to another feature of the invention, the phase angle controlled by the phase angle control means is synchronized with the chopping period of the pulse width control means.

Above and other objects of the present invention will become more apparent from the following description taken, by way of example only, in conjunction with the accompanying drawings, in which:

FIGS. 1 to 4 are to illustrate the principle of the invention, in which FIGS. 2A to 2C show signal waveform diagrams to illustrate operation of the circuit shown in FIG. 1, FIG. 3 graphically illustrates characteristic relations of the pulse width and the phase angle to a voltage command, and, FIG. 4 shows schematically a circuit arrangement of a function generator for obtaining the characteristic relations illustrated in FIG. 3;

In the first place, the principle of the present invention will be described by referring to FIGS. 1 to 4.

By way of example, it is assumed that the invention is applied to conversion of a three-phase alternating current or a.c. power source and that controllable switch or commutation means exhibiting current breaking function is constituted by gate turn-off thyristors (hereinafter referred to simply as GTO). However, it will be readily understood that the invention can also equally be applied to the conversion of a single-phase a.c. power and/or to the case where other type of switch or commutation means is adopted, as will be described hereinafter.

Figure 1:
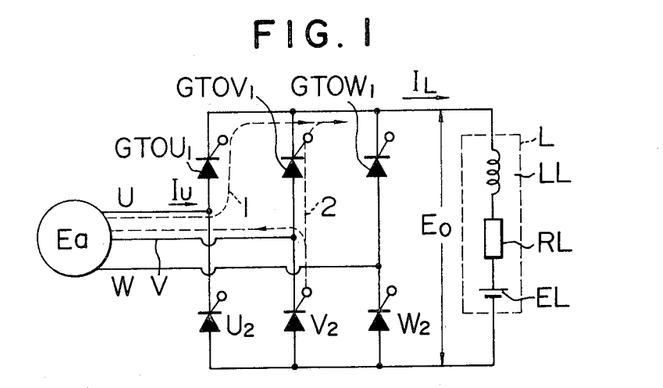
FIG. 1 shows a circuit arrangement of a three-phase full-wave bridge circuit.

FIG. 1 shows a circuit configuration of a three-phase full-wave bridge type rectifier circuit. In this figure, thyrsitors $GTOU_1$, $GTOV_1$ and $GTOW_1$ connected in respective bridge arms on the positive polarity side are each constituted by the gate turn-off thyristor or GTO, while the switching elements $U_2$, $V_2$ and $W_2$ connected in the respective bridge arms on the negative polarity side are each constituted by a thyristor for general use. A three phase a.c. power source Ea is connected to the a.c. input terminals of the full-wave bridge circuit. Direct current or d.c. output voltage Eo is controlled through gate control of $GTOU_1$, $GTOV_1$ and $GROW_1$ as well as the thyristor $U_2$, $V_2$ and $W_2$ and applied to a load L which may be composed of a resistor RL, an inductance LL and a source of d.c. voltage EL. In this connection, it is assumed that the load L has a time constant LL/RL which is sufficiently greater than the period of the a.c. power source and that the d.c. voltage EL is selected at a slightly lower value than that of the output voltage Eo. Such conditions may apply when the load is constituted by an armature circuit in the control of a d.c. motor, for example.

Figure 2A:
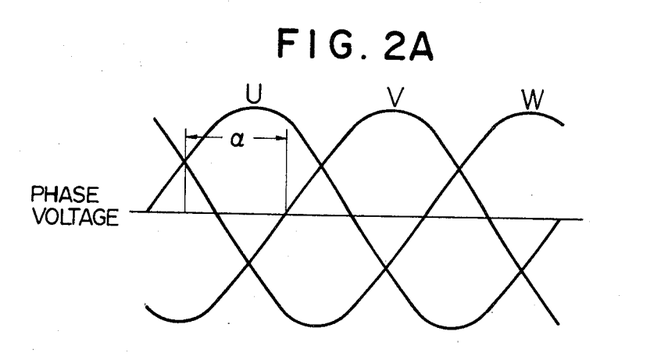
Figure 2B:
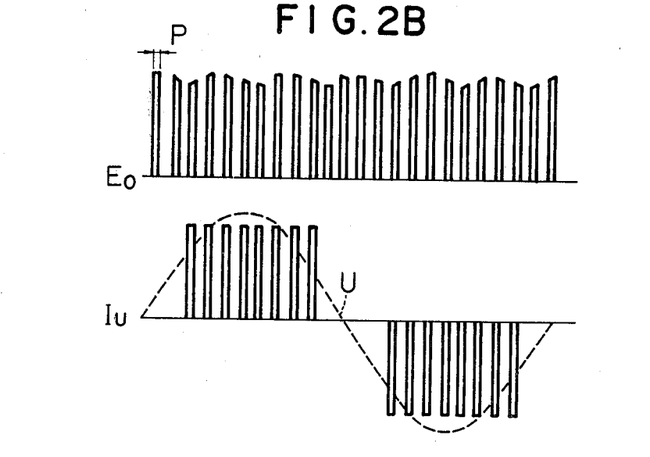
Figure 2C:
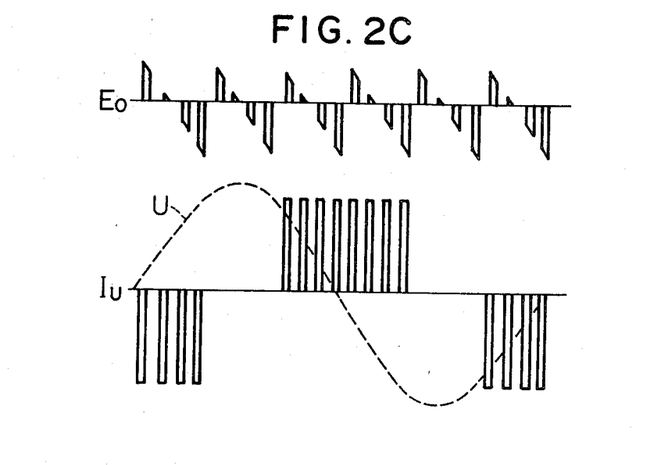

FIGS. 2A to 2C serve to illustrate operation of the circuit shown in FIG. 1 and shows waveforms of phase voltages U, V and W, the output d.c. voltage Eo and a U-phase current Iu. The phase angle for the gate control is denoted by $\alpha$. More particularly, in respect of $GTOU_1$, this phase angle is represented by a phase lag from a time point at which the phase voltage U, V or W is inverted from negative to positive polarity and will hereinater be also termed the control lag angle. Further, a pulse width of the pulse signal for chopping operation of $GTOU_1$, $GTOV_1$ and $GTOW_1$ is represented by P.

FIG. 2B illustrates waveforms produced when the thyristors $U_2$, $V_2$ and $W_2$ on the negatige side are fired with the control lag angle $\alpha$ of 0° when the chopping is performed with the pulse width P during periods in which the $GTOU_1$, $GTOV_1$ and $GTOW_1$ are rendered conductive, respectively, and which are determined by the control lag angle $\alpha$ at that instant.

In this case, when the $GTOU_1$ is fired, a current flows through the thyristor $V_2$, resulting in that a load current $I_L$ flows through the power supply source Ea, as indicated by a loop ① in FIG. 1. Subsequently, when the $GTOV_1$ is fired with the $GTOU_1$ being turned off, the load current $I_L$ flows along the path indicated by a loop ② in FIG. 1, shunting the power source Ea. The output voltage Eo is zero at this instant. As a result, the waveform of the output voltage Eo corresponds to a train of pulses each having the width P, as illustrated in FIG. 2B. Thus, by making the pulse with P variable, it is possible to control the output voltage Eo and the U-phase current IU. In this case, the phase lag of the phase current relative to the output voltage Eo is extremely small, to thereby permit the power factor to be approximated to 1 (one unit) However, because of a limitation on the possibility of narrowing the pulse width P, it is difficult to control the output voltage Eo to a level lower than 1/10 of the rated voltage.

To deal with the problem mentioned above, it is taught according to the invention that the pulse width P is narrowed to the possible shortest width and then the control lag angle $\alpha$ is controlled with the pulse width P being maintained in the narrowest state, to thereby allow the output voltage Eo to be continuously controlled to zero.

FIG. 2C illusrates waveforms of the output voltage Eo and the U-phase current which are obtained by setting the control lag angle $\alpha$ at about 90° with the pulse width P being maintained shortest (i.e.) by approximating the output voltage to zero. More particularly, the thyristors $U_2$, $V_2$ and $W_2$ shown in FIG. 1 are fired at the control lag angle of 90°, while the chopping operations are effected by the $GTOU_1$, $GTOV_1$ and $GTOW_1$ with the pulse width P during the periods in which the GTO's are made conductive, respectively. Describing in respect of the $GTOU_1$, the chopping operation is performed by the $GTOU_1$ in the pulse width P over a time span extending from the control lag angle $\alpha$ of the U-phase voltage U shown in FIG. 2A to the control lag $\alpha$ of the V-phase voltage V. In this manner, the reactive power can be significantly decreased, whereby the power factor is enhanced in a low power range, as can be seen from the illustration.

Figures 3, 4:
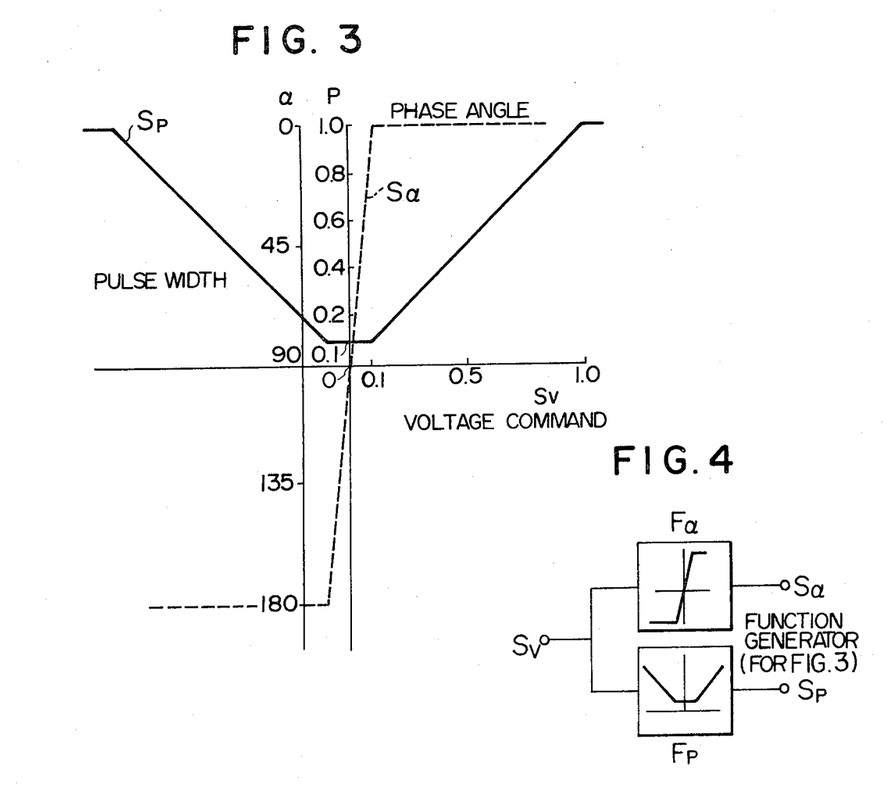

FIG. 3 graphically illustrates relationships of the phase angle and the pulse width to the output voltage. More specifically, FIG. 3 illustrates relationships Sp and S$\alpha$ of the pulse width P and the phase angle $\alpha$ to a voltage command Sv. The voltage command Sv taken along the abscissa is given in terms of ratio to the rated voltage, while the phase angle $\alpha$ and the pulse width P taken along the ordinate are given, respectively, in terms of the control lag angle and the ratio relative to the whole conducting period. As will be seen from FIG. 3, the pulse width Sp is varied until the ratio 1/10 of the rated voltage has been reached, while the phase angle S$\alpha$ is varied in the range lower than 1/10 of the rated voltage, so as to allow the output voltage to be controlled to zero.

Various means may be employed for varying the pulse width P and the phase angle α in accordance with the voltage command Sv in the manner mentioned above. An example of such means is schematically shown in FIG. 4. The apparatus is composed of function generators Fα and FP having respective characteristics such as shown. When the output signals Sp and Sα which are produced, respectively, from the function generators Fα and FP are utilized as a pulse width command signal and a phase angle command signal for the gate control of the gate turn-off thyristors $GTOU_1$, $GTOV_1$ and $GTOW_1$ and the thyristors $U_2$, $V_2$ and $W_2$, it is possible to accomplish the output voltage control in accordance with the voltage command Sv.

In more particular, when the pulse width P corresponding to the voltage command of 0.1 (i.e. 1/10 of the rated voltage) is maintained constant on one hand and the control lag angle α is varied from 90° to 0° on the other hand, the output voltage can be varied from zero to $0.1 \times 3\sqrt{2}/\pi$ Ea. Subsequently, by varying the pulse width P from 0.1 to 1, the output voltage is increased up to $3\sqrt{2}/\pi$ Ea at maximum.

In the control of the negative output voltage, the output voltage can be varied from 0 to $-0.1 \times 3\sqrt{2}/\pi$ Ea by varying the control lag angle α from 90° to 180°. Subsequently, by varying the pulse width P from 0.1 to 1, the negative output voltage can be increased up to $3\sqrt{2}/\pi$ Ea at maximum.

Now, an exemplary embodiment of the invention implemented on the basis of the principle described above will be elucidated by referring to FIGS. 5 to 9.

Figure 5:
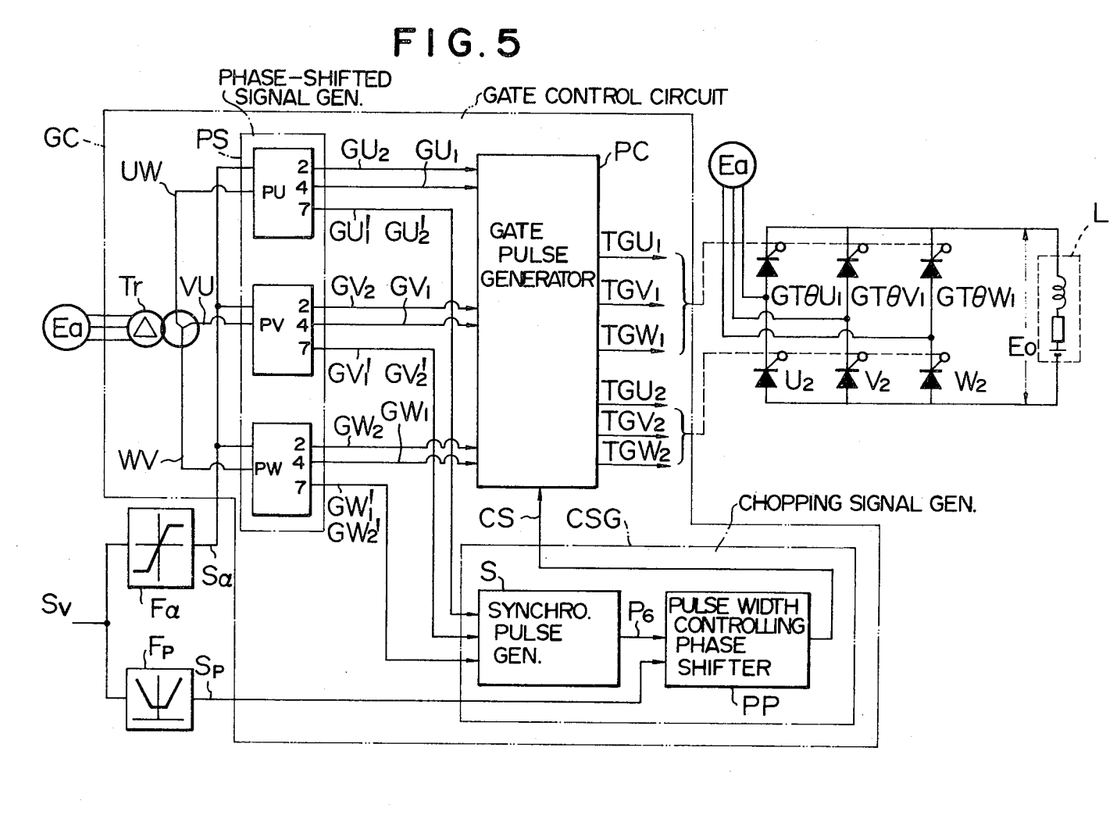
FIG. 5 is a circuit diagram showing a general arrangement of the power converter apparatus according to an embodiment of the invention.

FIG. 5 shows a general arrangement of a power converter apparatus, according to an embodiment of the invention, in which a gate control circuit GC includes as major components a phase shifted signal generator circuit PS, a chopping signal generating circuit CSG and a gate pulse generating circuit PC. The remaining circuit components are same as those described hereinbefore. The gate control circuit GC is so arranged as to perform the gate control for the gate turn-off thyristors $GTOU_1$, $GTOV_1$ and $GTOW_1$ and the thyristors $U_2$, $V_2$ and $W_2$ in accordance with the phase angle command signal Sα and the pulse width command signal Sp supplied from the function generators Fα and Fp, respectively.

In more detail, referring to FIG. 5, the three-phase voltages supplied from the power source Ea are transformed into line voltages UW, VU and WV having a neutral point through a transformer Tr. The line voltages are then supplied, respectively, to three-phase shifters PU, PV and PW are of which has the other input supplied with the phase command signal Sα. The phase command signal Sα is prepared by the function generator Fα in such a manner that the control lag angle α be zero in a range in which the voltage command signal Sv and hence the output voltage is of a great magnitude (refer to the corresponding characteristic curve illustrated in FIG. 3). Thus, the phase shifters PU, PV and PW produce phase control pulses in dependence on the phase command input Sα. The phase control pulses are then supplied to the gate pulse generating circuit PC and the chopping signal generator circuit CGS. In this connection, it should be mentioned that the phase control pulses $GU_1$, $GV_1$ and $GW_1$ for controlling the positive half-waves of the three-phase source voltage Ea are produced from pins numbered 4 of the phase shifters PU, PV and PW, while the pulses $GU_2$, $GV_2$ and $GW_2$ for controlling the negative half-wave of the source voltage Ea are produced from the pins numbered 2, respectively. On the other hand, the pulses $GU_1'$; $GU_2'$, $GV_1'$; $GV_2'$ and $GW_1'$; $GW_2'$ for controlling both the positive and negative half-waves of the source voltage Ea are produced from the pins numbered 7, respectively. Such phase shifter per se is hitherto known.

The phase-shifted pulse signals $GU_1'$; $GV_1'$; $GW_1'$ and $GU_2'$; $GV_2'$; $GW_2'$ produced from the pins 7 of the phase shifters PU, PV and PW are supplied to the input of a synchroniging pulse generating circuit S. This circuit S is composed of a pulse generator, flip-flops and so forth, as will hereinafter be described, wherein the pulse generator is driven in synchronism with the phase-shifted pulse signals $GU_1'$; $GV_1'$; $GW_1'$ and $GU_2'$; $GV_2'$ and $GW_2'$ to thereby preduce a synchronizing pulse signal $P_6$ having a preselected frequency which is higher than that of the source voltage Ea.

The synchronizing pulse signal $P_6$ is utilized in a pulse width controlling phase shifter PP for the gate turn-off thyristors GTO as the reference signal for the chopping functions.

The pulse width control phase shifter PP for the GTO's has other input supplied with the pulse width command signal Sp which is produced from the function generator Fp in such a manner the pulse width of the pulse width command pulse signal remains constant at a small value in a range in which the voltage command signal Sv and hence the output voltage is of a small magnitude, whereas in the range in which the voltage command signal Sv and hence the output voltage are of a large magnitude, the pulse width of the command pulse is increased (refer to the characteristics illustrated in FIG. 3). The pulse width controlling phase shifter PP produces a chopping signal CS at the frequency of the synchronizing pulse signal $P_6$ in conformance to the pulse width command signal Sp. This phase shifter PP may be constituted by IC Phase Shifter TCA 780 commercially available from Schiemens Co. Ltd. The chopping signal CS is supplied to the gate pulse generator circuit PC.

The gate pulse generator circuit PC produces gate signals $TGU_1$, $TGV_1$ and $TGW_1$ for the gate turn-off thyristors $GTOU_1$, $GTOV_1$ and $GTOW_1$ as well as the gate signals $TGU_2$, $TGV_2$ and $TGW_2$ for the thyristors $U_2$, $V_2$ and $W_2$ on the basis of the input signals mentioned above, as will hereinafter be described.

In this manner, in the case of the embodiment now being described, the chopping signal CS is synchronized with the phase-shifted signal by synchronizing the pulse signal input $P_6$ supplied to the pulse width control phase shifter PP with the phase-shifted signals from the three phase shifters PC.

Figure 6:
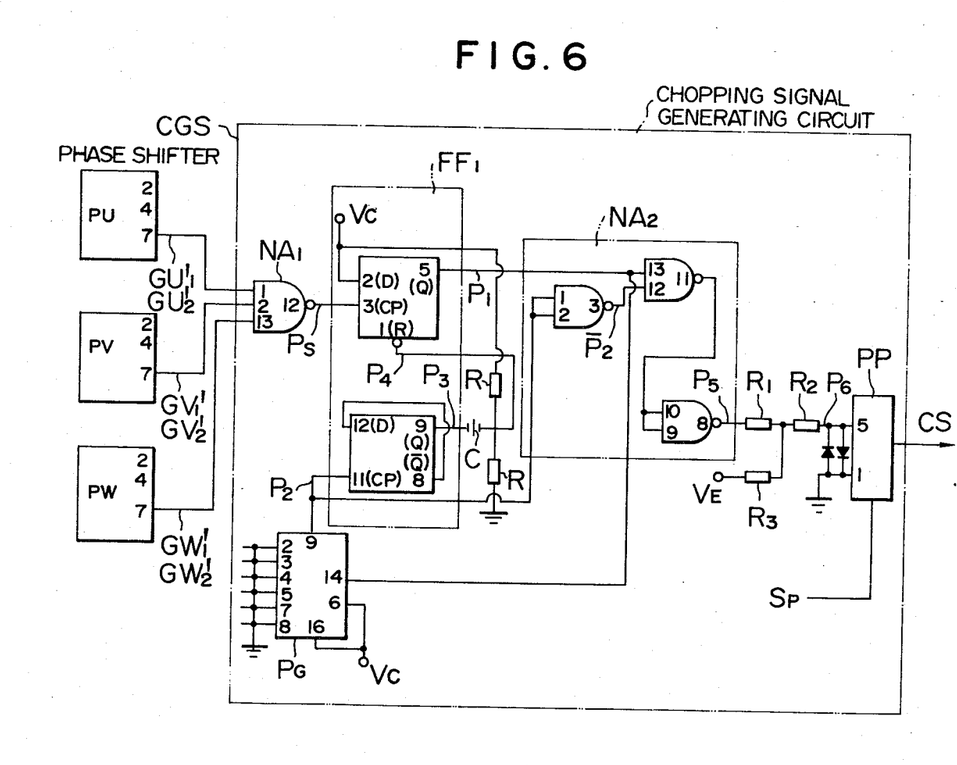
FIG. 6 shows a circuit configuration of a chopping signal generating circuit employed in the converter apparatus shown in FIG. 5.
Figure 7:
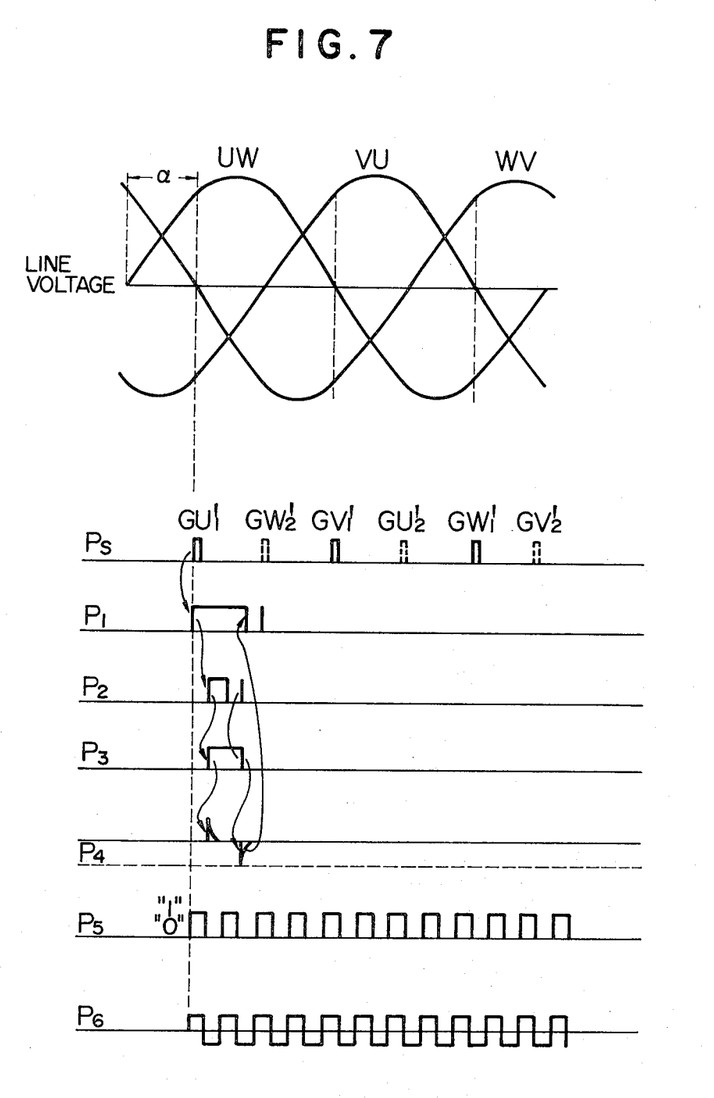
FIG. 7 shows signal waveforms to illustrate operation of the chopping signal generating circuit shown in FIG. 6.

FIG. 6 shows in a circuit diagram an exemplary embodiment of the chopping signal generating circuit CGS, and FIG. 7 shows signal waveforms to illustrate operations of the chopping signal generating circuit CGS.

Figure 9A:
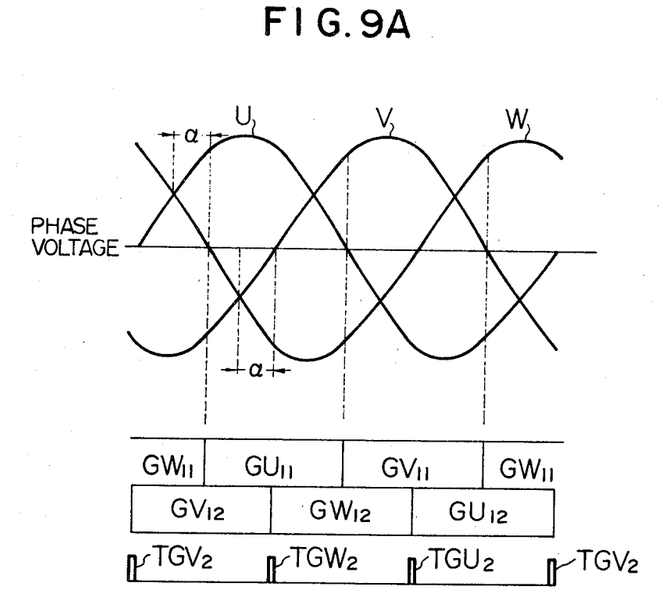
FIGS. 9A to 9D show signal waveform diagrams to illustrate operation of the gate pulse generating circuit shown in FIG. 8.
Figure 9B:
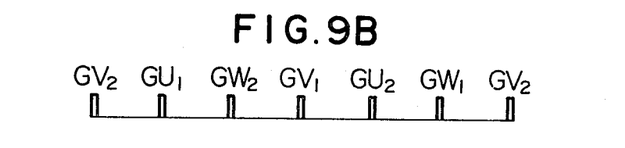

There are produced from the terminal pins 7 of the phase shifters PU, PV and PW the phase-shifted pulses $GU_1'$; $GU_2'$; $GV_1'$; $GV_2'$ and $GW_1'$; $GW_2'$, respectively, which correspond to the positive half-waves and the negative half-waves of the source voltage waveforms UW, VU and WU phase-shifted by the phase command signal Sa and are applied to input terminals 1, 2 and 13 of a NAND circuit NA1. The NAND circuit NA1 then produces at the output terminal 12 thereof a pulse train signal Ps illustrated in FIG. 7 and including six pulse trains which correspond to the serialized phase-shifted signals $GU_1'$; $GU_2'$, $GV_1'$; $GV_2'$ and $GW_1'$; $GW_2'$ produced from the phase shifters PU, PV and PW. Accordingly, the pulse signal Ps has a frequency which is six times as high as that of the a.c. source voltage Ea. For example, when the frequency of the source voltage Ea is assumed to be equal to 50 Hz, the pulse repetition frequency of the pulse train signal Ps is 300 Hz. This pulse train signal Ps is identical with the pulse trains $GU_1$ to $GV_2$ which are illustrated in FIG. 9B.

The pulse train signal Ps is supplied to a D-type flip-flop element FF1 which then produces an output signal P1 in response to the leading or rise-up edge of the pulse $GU_1'$.

The output signal P1 of the D-type flip-flop element FF1 is applied to an input terminal 13 of the NAND circuit $NA_2$ and at the same time to an input terminal 14 of a programmable pulse generator PG. The latter may be constituted by a hybrid IC which incorporates therein a high precision crystal oscillator and has a great flexibility for general use. The programmable pulse generator PG is so designed as to be capable of producing selectively fifteen seven kinds of output frequencies in a range of 60 KHz to 0.0005 Hz. In the case of the illustrated example, it is however assumed that the pulse generator PG is so programmed that a pair of pulses are generated between the adjacent pulses of the six pulse train by setting the terminals 2, 3, 4, 5, 7 and 8 to zero potential in comman.

In this manner, a pulse signal $P_2$ (FIG. 7) is produced from an output terminal 9 of the pulse generator PG and applied to input terminals 1 and 2 of a NAND circuit $NA_2$ as well as to a terminal 11 of the D-type flip-flop $FF_1$, which results in that a pulse signal $P_3$ (FIG. 7) is produced from an output terminal 9 of the flip-flop $FF_1$. The output pulse signal $P_3$ is transformed into a saw tooth waveform signal $P_4$ through a capacitor C and a resistor R, which signal $P_4$ is then applied to the terminal 1 of the D-type flip-flop $FF_1$. The pulse signals $P_1$ to $P_4$ mentioned above are illustrated in FIG. 7.

In response to the application of the saw tooth waveform signal $P_4$, the output signal $P_1$ appearing at the terminal 5 of the D-type flip-flop circuit $FF_1$ becomes logic "0". At this time, the output signal $P_5$ from the NAND circuit $NA_2$ corresponds to a logical product $\overline{P_1 \cdot P_2}$, whereby two pulses are produced between the pulses $GU_1'$ and $GW_2'$, for example, of the pulse train signal Ps. The output pulse signal $P_5$ comprises logic "0" and "1" levels. A negative potential VE is applied to a junction of resistors $R_1$ and $R_2$ through a resistor $R_3$, to thereby obtain a pulse train signal $P_6$ (FIG. 7) composed of positive and negative individual pulses. This pulse signal $P_6$ is very effective and advantageous in consideration of the fact that the GTO pulse width control phase shifter PP operates in response to the positive and the negative pulses. It is to be noted that the frequency of the pulse signal $P_6$ is 600 Hz which is six times as high as the power source frequency of 50 Hz.

In the foregoing, description has been made in conjunction with the generation of the paired pulses between the pulses $GU_1'$ and $GW_2'$ of the pulse train signal Ps (reference is to be made to FIG. 7). It is however readily understood that the output signal $P_1$ from the D-type flip-flop element FF is also produced in response to the rise-up edge of the pulse $GW_2'$ to cause the programmable pulse generator PG to be operated in a similar manner. In other words, the pulse generating circuit CGS perform the operation described above every time the individual pulses $GU_1',-, GV_2'$ of the pulse train signal Ps are applied to the input of the circuit CGS. As the consequence, the output pulses from the pulse generator PG are produced constantly in synchronism with the phase-shifted pulses $GU_1',-, GV_2'$ in a stable manner.

The output pulse train signal $P_6$ thus obtained is applied to the GTO pulse width controlling phase shifter PP which per se has heretofore been known, whereby the chopping pulse signal PS having a duration (or pulse width) corresponding to the pulse width command signal Sp is produced.

Figure 8:
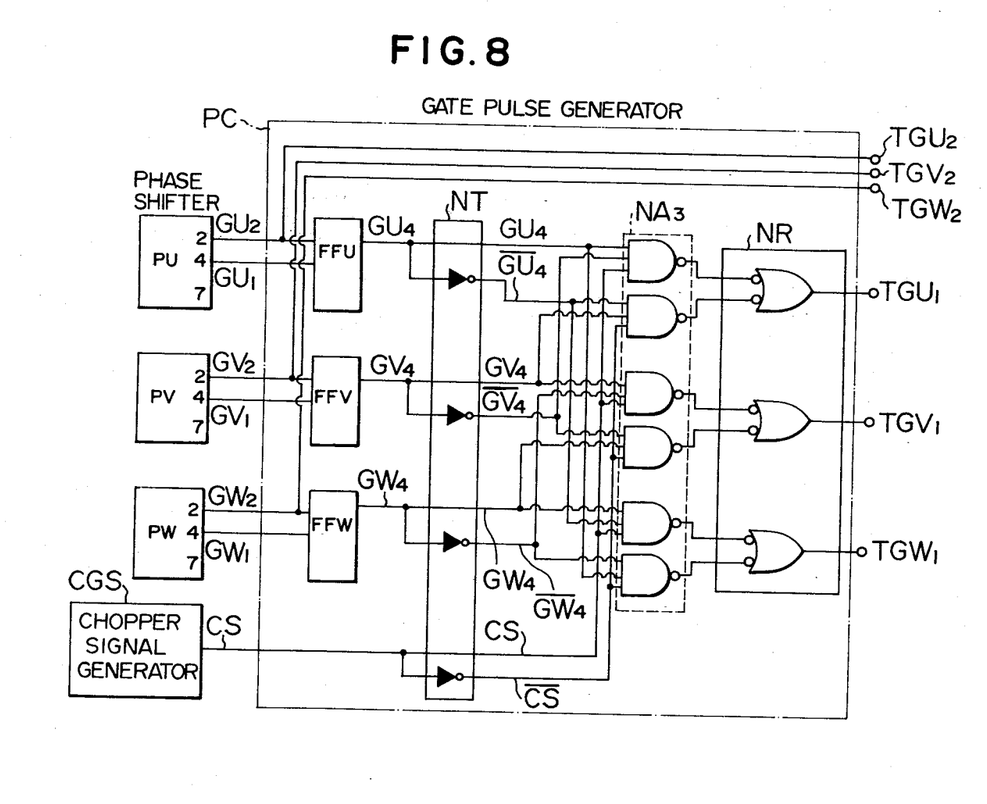
FIG. 8 shows a circuit configuration of a gate pulse generating circuit used in the converter apparatus shown in FIG. 5.

FIG. 8 shows an exemplary circuit configuration of the gate pulse generating circuit PC, and FIG. 9 shows signal waveforms to illustrate operation of the gate pulse generating circuit PC.

Here, it should be mentioned that each of the gate signals $TGU_1$, $TGV_1$ and $TGW_1$ for the $GTOU_1$, and $GTOV_1$ and $GTOW_1$ has two types of firing modes. In more particular, describing in conjunction with $GTOU_1$, there are two types of periods, i.e. one period during which the load current flows into the power supply source when the $GTOU_1$ is fired (that is, the period during which the output voltage is produced and which is referred to as the conduction enabled period), and the other period during which the load current shunts the power supply source (that is, the period during which the output voltage is zero and which is referred to as the shunt period). The former period is designated by $GU_{11}$, while the latter is designated by $GU_{12}$. For the other gate pulses, the corresponding periods are designated by attaching the same suffixes. These periods are illustrated in FIG. 9A which is depicted on the assumption that the control lag angle is $\alpha$. The same applies to FIGS. 9B, 9C and 9D.

The gate pulse signal $TGU_1$ is only required to be a positive voltage during the period in which the $GTOU_1$ is conducting and remain zero during the non-conducting period of the $GTOU_1$. On the other hand, the gate pulse $TGU_2$ is only required to generate a pulse of narrow width upon being fired under the load condition illustrated in FIG. 1 where the load current flows continuously.

The basic signals from which those mentioned just above are derived are supplied from the terminals 2 and 4, respectively, of the three-phase phase shifters PU, PV and PW described hereinbefore. These basic signals are illustrated in FIG. 9B in the form of a pulse train. As can be seen from this figure, for the gate pulses $TGU_2$, $TGV_2$ and $TGW_2$ for the thyristors $U_2$, $V_2$ and $W_2$ on the negative side, relations $TGU_2 = Gu_2$, $TGV_2 = GV_2$ and $TGW_2 = GW_2$ apply, respectively. In other words, the pulses appearing at the terminals 2, respectively, of the three-phase phase shifters PU.PV and PW may be utilized as the gate pulses $TGU_2$, $TGV_2$ and $TGW_2$, as they are. Therefore, the following description is directed to the gate pulses $TGU_1$, $TGV_1$ and $TGW_1$.

Figure 9C:
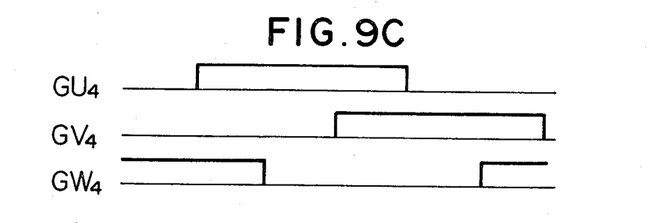
Figure 9D:
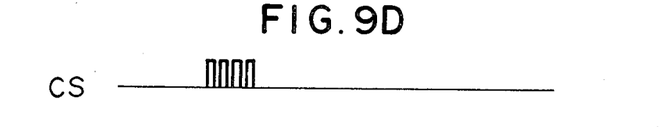

When the pulses $GU_1$, $GU_2$, $GV_1$; $GV_2$ and $GW_1$; $GW_2$ illustrated in FIG. 9C are supplied to flip-flop circuits FFU, FFV and FF, respectively, as indicated in FIG. 8, there are produced pulses $GU_4$, $GV_4$ and $GW_4$ which are continuously maintained at high level during time spans between $GU_1$ and $GU_2$, between $GV_1$ and $GV_2$ and between $GW_1$ and $GW_2$, respectively. These pulses $GU_4$, $GV_4$ and $GW_4$ are illustrated in FIG. 9C. On the other hand, the chopping signal CS having a pulse width corresponding to the pulse width command signal Sp is inputted from the chopping signal generating circuit CGS. In FIG. 9D, only the chopping signal CS that is in synchronism with the phase angle pulse GU$_1$ is representatively shown. It will readily be appreciated that other chopping signals synchronized with the respective associated phase signals are successively applied as the inputs. The gate pulses TGU$_1$, TGV$_1$ and TGW$_1$ to be applied to the GTOU$_1$, GTOV$_1$ and GTOW$_1$ are produced in accordance with the following logical expressions:

$$\left.\begin{array}{l} GU_{11} = GU_4 \cdot \overline{GV_4} \cdot CS \\ GV_{11} = GV_4 \cdot \overline{GW_4} \cdot CS \\ GW_{11} = GW_4 \cdot \overline{GU_4} \cdot CS \\ GU_{12} = \overline{GU_4} \cdot GV_4 \cdot CS \\ GV_{12} = \overline{GV_4} \cdot GW_4 \cdot CS \\ GW_{12} = \overline{GW_4} \cdot GU_4 \cdot CS \end{array}\right\} \quad (1)$$

$$\left.\begin{array}{l} TGU_1 = GU_{11} + GU_{12} = GU_4 \cdot \overline{GV_4} \cdot CS + \overline{GU_4} \cdot GV_4 \cdot \overline{CS} \\ TGV_1 = GV_4 \cdot \overline{GW_4} \cdot CS + \overline{GV_4} \cdot GW_4 \cdot \overline{CS} \\ TGW_1 = GW_4 \cdot \overline{GU_4} \cdot CS + \overline{GW_4} \cdot GU_4 \cdot \overline{CS} \end{array}\right\} \quad (2)$$

To this end, the pulses GU$_4$, GV$_4$ and GW$_4$ are applied to a NOT circuit NT together with the chopping signal CS. The output pulses from the NOT circuit NT are applied to a three-gate NAND circuit NA$_3$, to thereby obtain the pulse outputs which satisfy the logical expressions (1). The output pulses thus obtained are then supplied to a two-gate NOR circuit NR so that the logical expressions (2) be satisfied, whereby the gate pulses TGU$_1$, TGV$_1$ and TGW$_1$ are derived.

In this way, the gate pulses TGU$_1$; TGV$_1$; TGW$_1$ and TGU$_2$; TGV$_2$; TGW$_2$ can be produced.

Figure 10:
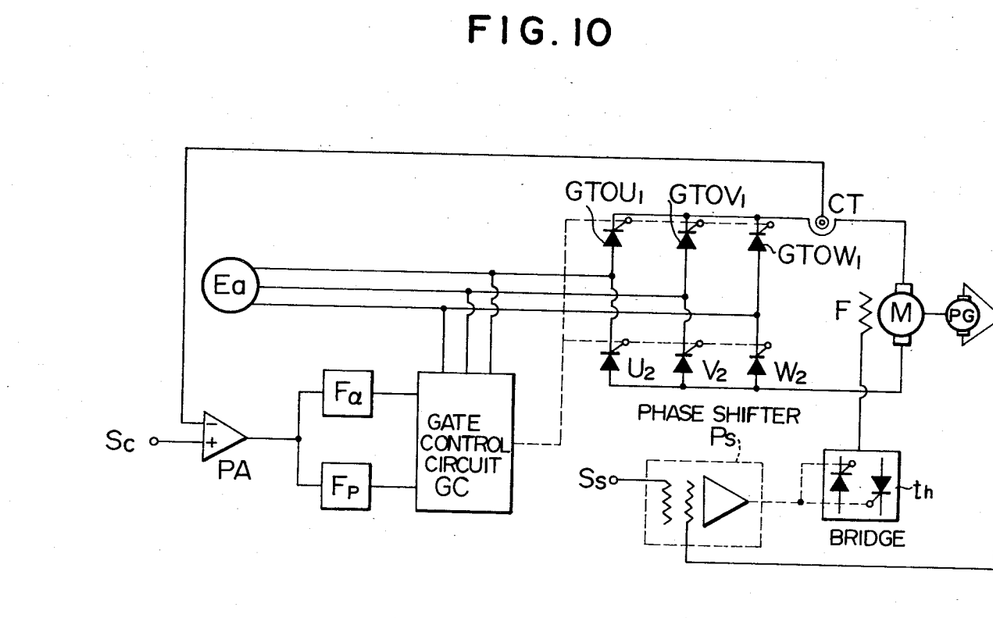
FIG. 10 is a circuit diagram showing a d.c. motor control system in which a power converter apparatus according to the invention is used.

FIG. 10 shows an example of applications of the invention in which the power converter apparatus according to the invention is employed for a speed control of a d.c. motor.

In the figure, a reference symbol M designates an armature of a d.c. motor, F designates a field system, th denotes a push-pull thyristor amplifier, and Ps denotes a phase shifter for the thyristor amplifier th. Further, GC designates the gate control circuit shown in FIG. 5, and PA designates a comparator for comparing an output signal from a direct current transducer CT destined for detecting an armature current with an armature current command signal Sc.

The armature current is controlled to be constant in accordance with the armature current command Sc. An actual speed signal produced from a tachometer generator PG is compared with a speed command signal Ss by means of the phase shifter Ps, the resultant signal being utilized for controlling the field current in negative or positive going direction, as the case may be, whereby the field current is controlled so as to conform to the speed command Ss.

With the control system described above, it can be accomplished in one direction of armature current to operate the d.c. motor in four different modes, i.e. a forward rotation mode, a backward or reverse rotation mode, a power running mode and a regeneration mode. Further, because the armature current is continuously controlled so as to be constant all the time, the gate pulses for the thyristors U$_2$, V$_2$ and W$_2$ may be of a narrow width (i.e. short duration).

When service interruption occurs in the regeneration mode of operation, rendering the output voltage from the thyristor circuit to be zero, then there will arise a danger that the armature current is rapidly increased to eventually destroy the thyristors. With a view to evading such difficulty, it is a common practice to insert a d.c. contactor in the armature circuit. In contrast, according to the invention, it is possible to cut off the armature current when it has increased beyond a predetermined level by supplying a gate turn-off pulse signal to the thyristor circuit in which gate turn-off thyristors GTOU$_1$, GTOV$_1$ ang GTOW$_1$ are used in the full-wave bridge on the positive side thereof. By virtue of this feature, it is unnecessary to use the d.c. contactor, allowing the overall system to be inexpensively implemented in a reduced size.

Besides, the power factor in the power converter operation mode as well as in the power invertor operation mode can be significantly improved, allowing the capacity of the power supply source to be decreased in addition to the unnecessity of use of the d.c. contactor.

In the foregoing description, it has been assumed that the switch elements provided in the arms of positive polaristy of the bridge circuit are constituted by the gate turn-off thyristors or GTO's while the switch elements on the negative side are constituted by the thyristor for general use. However, the switch elements U$_2$, V$_2$ and W$_2$ may be constituted by the gate turn-off thyristors, while the switch elements or GTO's on the positive side of the bridge circuit are replaced by the thyristors for general use, to the similar effect.

Figure 11:
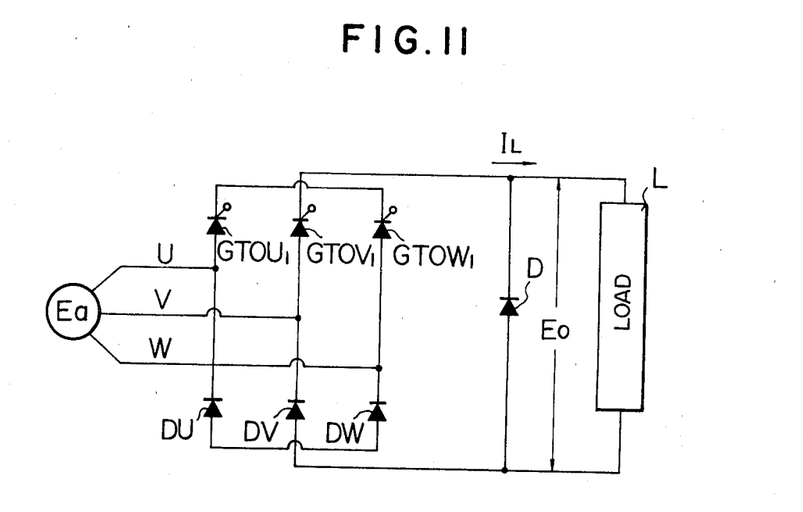
FIG. 11 is a circuit diagram showing a three-phase full-wave bridge circuit according to another embodiment of the invention.
Figure 12A:
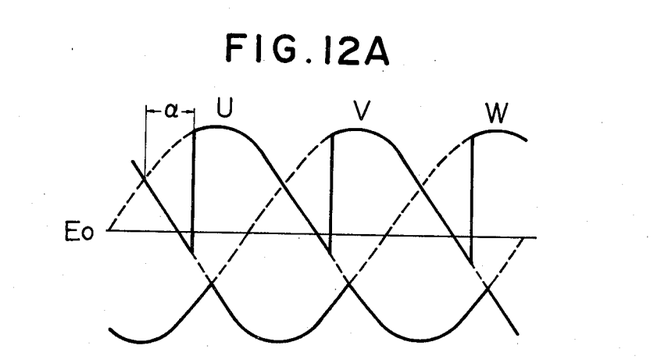
FIGS. 12A and 12B are signal waveform diagrams to illustrate operation of the bridge circuit shown in FIG. 11.
Figure 12B:
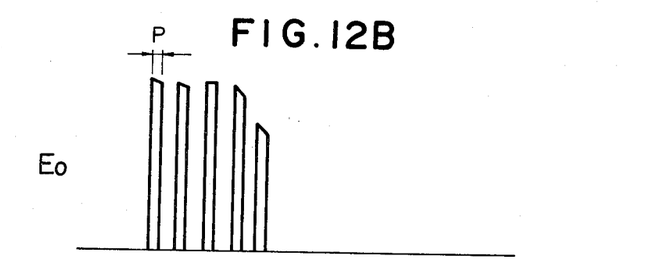

FIG. 11 shows another exemplary embodiment of the invention, and FIG. 12 shows signal waveforms for illustrating operations thereof. In the case of the illustrative embodiment described above, the thyristors U$_2$, V$_2$ and W$_2$ are connected to the negative terminal of the full-wave bridge circuit in order to permit the power invertor operation in addition to the power converter operation. However, in the case of application where such power invertor operation is not required, the thyristors U$_2$, V$_2$ and W$_2$ can be replaced by diodes DU, DV and DW, respectively, as is shown in FIG. 11.

In FIG. 12A, the d.c. output voltage Eo of the bridge circuit shown in FIG. 11 which is produced through control only of the control lag angle $\alpha$ of the GTOU$_1$, GTOV$_1$ and GTOW$_1$ is represented by a solid line curve. FIG. 12B shows the corresponding d.c. output voltage Eo which is derived by controlling the pulse width P of the gate pulses for controlling the GTOU$_1$, GTOV$_1$ and GTOW$_1$ with the control lag angle $\alpha$ being maintained at a preselected value as described hereinbefore. The waveform shown in FIG. 12B is depicted on the assumption that the chopping is effected five times.

In this manner, the invention can be effectively and advantageously applied also to the power conversion only in the forward direction. The power conversion can be effected over a wide range with an improved power factor by controlling the phase angle or control lag angle $\alpha$ and the pulse width P of the gate pulses. A diode D connected in parallel with the full-wave bridge circuit will prevent the load current I$_L$ from flowing through the power supply source when the GTOU$_1$, GTOV$_1$ or GTOW$_1$ are blocked. Consequently, it is no more required to shunt the power source by switching altenatively the $GTOU_1$, $GTOV_1$ and $GTOW_1$ in the manner described hereinbefore in conjunction with the embodiment shown in FIG. 1 (refer to the loop path ②), whereby the control is much facilitated.

In the foregoing, description has been made on the power conversion between the three-phase, a.c. source and the d.c. line or load. However, it goes without saying that the invention can equally be applied to conversions of other poly-phase a.c. power or a single-phase a.c. power.

Figure 13:
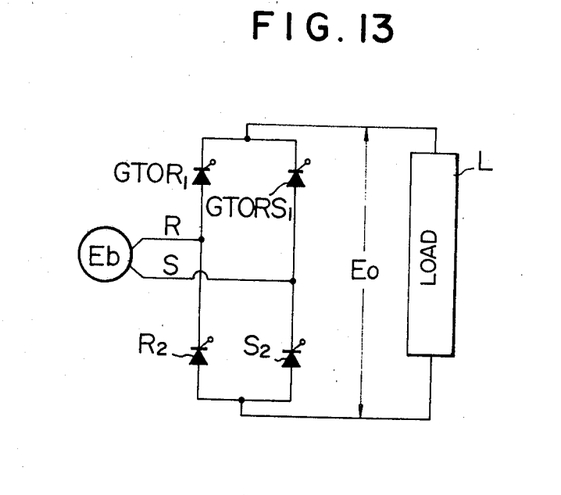
FIG. 13 is a circuit diagram to show a single-phase full-wave bridge circuit according to still another embodiment of the invention.
Figure 14A:
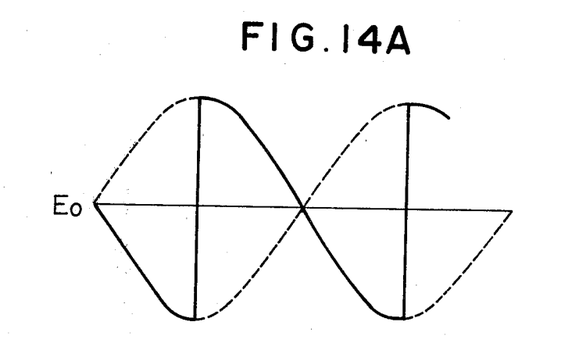
FIGS. 14A and 14B are signal waveform diagrams to illustrate operation of the bridge circuit shown in FIG. 13.
Figure 14B:
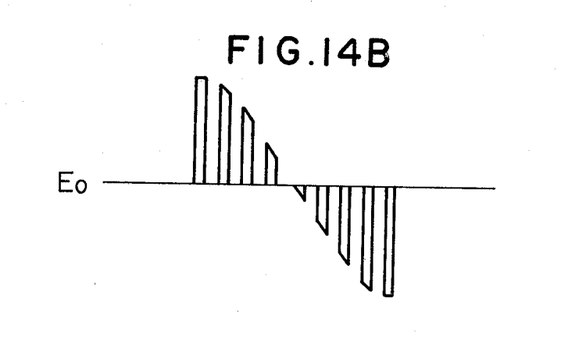

FIG. 13 shows another exemplary embodiment of the invention in which the power conversion is effected between a single-phase a.c. power source and a d.c. system. FIGS. 14A and 14B show signal waveforms for illustrating operation of the power converter shown in FIG. 13.

Referring to FIG. 13, a bridge circuit composed of gate turn-off thyristor $GTOR_1$ and $GTOS_1$ and thyristors $R_2$ and $S_2$ is connected between a single-phase a.c. power source Eb and a d.c. load L. FIG. 14A shows an output voltage Eo produced when only the phase angle (control lag angle $\alpha$) for the $GTOR_1$, $GTOS_1$ and the thyristors $R_2$ and $S_2$ is controlled, while FIG. 14B shows an output voltage Eo which is produced when the $GTOR_1$ and $GTOS_1$ are controlled by the gate pulse of a pulse width P in addition to the control of the lag angle $\alpha$. The illustrated signal waveform corresponds to a case where the control lag angle $\alpha$ is set at 90° with the output voltage Eo being zero. It is noted that the power factor at the time of the output voltage Eo being zero can be remarkably improved by reducing the pulse width P to a possible minimun, as in the case of the embodiments described hereinbefore. Further, when the lag angle $\alpha$ is controlled over a range of 0° to 180° in conbination with the control of the pulse width P from maximum to minimun, then the control can be performed over the whole range which covers both the forward conversion and the backward (regenerative) conversion.

It will now be understood that the invention teaches that the phase angle (herein referred to also as the control lag angle) of the switch means capable of exhibiting the current breaking function is controlled and that the width of the switching pulses for the switch means is additionally controlled during the so-called conduction-enabled period determined by the phase angle. It is also possible to carry out the invention in such a manner that the gate turn-off thyristor or GTO is inserted only for a single phase in place of providing the GTO for all the phases. In this case, the power factor is improved for the phase for which the GTO is used. In other words, the present invention can be effectively applied to a power converter system in which only one arm of a full-wave bridge circuit is provided with the switch means capable of breaking the commutated current. Further, the switch means is not restricted to the gate turn-off thyristors.

What is claimed is:

1. A power converter apparatus for effecting power conversion between an a.c. system and a d.c. system by using a full-wave bridge circuit in which at least one arm is provided with controllable switch means capable of performing a current breaking function, comprising:
   phase angle control means for controlling phase angle of said switch means;
   pulse width control means for controlling width of pulse which causes said switch means to perform current chopping operation; and
   gate signal generating means for turning on and off said switch means with said chopping pulse of the controlled pulse width during a conduction-enabled period determined at least by said phase angle.

2. A power converter apparatus according to claim 1, wherein said gate signal generating means is arranged to generate a gate signal which is effective to turn on and off said switch means plural times with said pulse of the controlled pulse width during said conduction-enabled period.

3. A power converter apparatus according to claim 1, wherein said phase angle control means and said pulse width control means are so arranged as to vary said phase angle and said pulse width in dependence with a desired voltage appearing between d.c. terminals of said full-wave bridge circuit.

4. A power converter apparatus according to claim 3, wherein said pulse angle is made variable when said desired voltage is not higher than a predetermined value, while said pulse width is made variable when said desired voltage goes beyond said predetermined value.

5. A power converter apparatus according to claim 4, wherein said phase angle control means is adapted to vary said phase angle in accordance with said desired voltage when said desired voltage is not higher than said predetermined value, and maintain said phase angle to be smallest when said desired voltage goes beyond said predetermined value.

6. A power converter apparatus according to claim 4, wherein said pulse width control means is adapted to maintain said pulse width to be smallest when said desired voltage is not higher than said predetermined value and make said pulse width variable in accordance with said desired voltage when said desired voltage goes beyond said predetermined value.

7. A power converter apparatus according to claim 1, wherein arms of said full-wave bridge circuit on both positive and negative sides thereof are each provided with said switch means capable of performing the current breaking function, each of said switch means being provided with said gate signal generating means for producing a gate pulse for said switch means in accordance with the phase angle and the pulse width.

8. A power converter apparatus according to claim 1, further including short-circuit means for making short-circuit across said d.c. terminals of said full-wave bridge circuit, when at least one of said switch means is opened to break the current.

9. A power converter apparatus according to claim 8, wherein all arms of said full-wave bridge circuit on positive side thereof or alternatively on negative side are each provided with the controllable switch means capable of performing current breaking function, said short-circuit means being adapted to close the switch means corresponding to a period in which said d.c. terminals are short-circuited.

10. A power converter apparatus according to claim 8, wherein said short-circuit means is constituted by a rectifier element connected between said d.c. terminals in parallel to and in the same direction as said full-wave bridge circuit.

11. A power converter apparatus according to claim 1, wherein a phase-shifted signal controlled by said phase angle control means is synchronized with a chopping period of said pulse width control means.

12. A power converter apparatus according to claim 11, wherein said pulse width control means includes a pulse generator for producing a pulse signal which determines said chopping period and a pulse width controlling phase shifter for receiving said pulse signal as the input thereto and varying controllably said pulse width, the output pulse signal produced from said pulse generator being synchronized with said phase shift signal.

13. A power converter apparatus according to claim 13, wherein said full-wave bridge circuit is constituted by a three-phase full-wave bridge circuit, said gate signal generating means being adapted to turn on and off said switch means at a frequency which is at least six times as high as that of said a.c. system.

14. A power converter apparatus according to claim 1, wherein said full-wave bridge circuit is constituted by a single-phase full-wave bridge circuit, said gate signal generating means being adapted to turn on and off said switch means at a frequency which is at least twice as high as that of said a.c. system.

15. A power converter apparatus according to claim 1, wherein an armature circuit of a d.c. motor is connected across d.c. terminals of said full-wave bridge circuit.

* * * * *